(12) United States Patent
Schoenfeld et al.

(10) Patent No.: US 6,889,336 B2
(45) Date of Patent: May 3, 2005

(54) APPARATUS FOR IMPROVING OUTPUT SKEW FOR SYNCHRONOUS INTEGRATE CIRCUITS HAS DELAY CIRCUIT FOR GENERATING UNIQUE CLOCK SIGNAL BY APPLYING PROGRAMMABLE DELAY TO DELAYED CLOCK SIGNAL

(75) Inventors: Aaron M. Schoenfeld, Boise, ID (US); Vladimir Mikhalev, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 679 days.

(21) Appl. No.: 09/754,972

(22) Filed: Jan. 5, 2001

(65) Prior Publication Data

US 2002/0091958 A1 Jul. 11, 2002

(51) Int. Cl.[7] ................................................. G06F 1/04
(52) U.S. Cl. ........................ 713/503; 713/401; 713/600
(58) Field of Search ................................. 713/503, 600, 713/400, 401, 501; 711/167; 327/161

(56) References Cited

U.S. PATENT DOCUMENTS

| | | | |
|---|---|---|---|
| 4,949,361 A | 8/1990 | Jackson ...................... 375/118 |
| 5,398,262 A | * 3/1995 | Ahuja ......................... 375/356 |
| 5,414,381 A | * 5/1995 | Nelson et al. ............... 327/262 |
| 5,692,165 A | 11/1997 | Jeddeloh et al. ............ 395/551 |
| 5,812,462 A | 9/1998 | Merritt .................. 365/189.05 |
| 5,819,076 A | 10/1998 | Jeddeloh et al. ............ 395/552 |
| 5,852,378 A | 12/1998 | Keeth ......................... 327/171 |
| 5,857,095 A | 1/1999 | Jeddeloh et al. ............ 395/552 |
| 5,875,134 A | 2/1999 | Cloud ......................... 365/193 |
| 5,886,948 A | 3/1999 | Ryan .......................... 365/233 |
| 5,903,747 A | * 5/1999 | Casal ......................... 713/501 |
| 5,920,518 A | 7/1999 | Harrison et al. ............ 365/233 |
| 5,923,611 A | 7/1999 | Ryan .......................... 365/233 |
| 5,930,198 A | 7/1999 | Ryan .......................... 365/233 |
| 5,936,893 A | 8/1999 | Merritt .................. 365/189.05 |
| 5,986,948 A | 11/1999 | Cloud ......................... 365/193 |
| 6,026,051 A | 2/2000 | Keeth et al. ................ 365/233 |
| 6,069,506 A | 5/2000 | Miller, Jr. et al. .......... 327/156 |
| 6,069,510 A | 5/2000 | Keeth ......................... 327/170 |
| 6,100,733 A | 8/2000 | Dortu et al. ................ 327/149 |

(Continued)

FOREIGN PATENT DOCUMENTS

JP    6-349946    * 12/1994

OTHER PUBLICATIONS

"DDR SDRAM Functionality and Controller Read Data Capture", *DesignLine*, vol. 8, Issue 3, 3Q99, Micron Technology, Inc., pp. 1–24, (1999).

"Double Data Rate (DDR) Sdram", *Micron Semiconductor Products, Inc., 64Mb: x4, x8, x16 DDR SDRAM*, pp. 1–66, (2000).

*Primary Examiner*—Chun Cao
(74) *Attorney, Agent, or Firm*—Schwegman, Lundberg, Woessner & Kluth, P.A.

(57) ABSTRACT

A method and apparatus for improving output skew across the data bus of a synchronous integrated circuit device. The device includes a clock input buffer that receives a system clock signal and generates a buffered clock signal, a delay line that receives the buffered clock signal and generates a delayed clock signal, and an output circuit including output signal paths for outputting the output signals synchronously with the system clock signal by using the delayed clock signal. At least one of the output signal paths includes a delay circuit and an output buffer. Each delay circuit provides a programmable delay to the delayed clock signal to generate a unique delayed clock signal used to clock an output signal into the respective output buffer. By programming the delays based upon output skew, the output skew can be improved.

41 Claims, 6 Drawing Sheets

U.S. PATENT DOCUMENTS

| | | | | |
|---|---|---|---|---|
| 6,104,209 | A | | 8/2000 | Keeth et al. .................. 326/83 |
| 6,104,643 | A | | 8/2000 | Merritt ................. 365/189.05 |
| 6,111,446 | A | | 8/2000 | Keeth ......................... 327/258 |
| 6,137,334 | A | | 10/2000 | Miller, Jr. et al. .......... 327/271 |
| 6,141,292 | A | * | 10/2000 | Lee et al. ................... 365/233 |
| 6,167,528 | A | * | 12/2000 | Arcoleo ...................... 713/501 |
| 6,240,042 | B1 | * | 5/2001 | Li .............................. 365/233 |
| 6,243,797 | B1 | | 6/2001 | Merritt ....................... 711/167 |
| 6,256,260 | B1 | * | 7/2001 | Shim et al. ................. 365/233 |
| 6,340,905 | B1 | * | 1/2002 | Schultz ....................... 327/161 |
| 6,469,550 | B1 | * | 10/2002 | Kurd .......................... 327/141 |
| 6,510,503 | B2 | * | 1/2003 | Gillingham et al. ........ 711/167 |
| 6,570,428 | B1 | * | 5/2003 | Liao et al. .................. 327/291 |
| 6,598,171 | B1 | * | 7/2003 | Farmwald et al. .......... 713/401 |
| 6,704,881 | B1 | * | 3/2004 | Li et al. ..................... 713/401 |
| 6,779,097 | B2 | * | 8/2004 | Gillingham et al. ........ 711/167 |

* cited by examiner

APPARATUS FOR IMPROVING OUTPUT SKEW FOR SYNCHRONOUS INTEGRATE CIRCUITS HAS DELAY CIRCUIT FOR GENERATING UNIQUE CLOCK SIGNAL BY APPLYING PROGRAMMABLE DELAY TO DELAYED CLOCK SIGNAL

FIELD OF THE INVENTION

The present invention generally relates to the field of integrated circuit devices, and more particularly relates to the generation of signals across an output bus of such a device.

BACKGROUND

As the processing speeds of computer systems have continually increased, there has been a corresponding need for faster and faster random access memory (RAM) devices. RAM devices, such as dynamic random access memory (DRAM) devices, are typically used as the main memory in computer systems. While DRAM devices have gotten faster over the years, the operating speeds of DRAM devices still lag behind the operating speeds of the processors which access the DRAM devices. Consequently, the relatively slow access and cycle times of DRAM devices slow down the processors, and create bottlenecks.

In response to the need for faster DRAM devices, synchronous dynamic random access memory (SDRAM) devices have been developed. SDRAM devices operate synchronously with the system clock which drives the processor that accesses the devices, with the input and output data of the SDRAM devices being synchronized to an active edge of the system clock. The initial SDRAM devices can be referred to as single data rate (SDR) SDRAM devices since their peak data rate is equal to the rate at which commands can be clocked into the devices. Single data rate SDRAMs are currently in widespread use.

To provide still faster DRAM devices, double date rate (DDR) SDRAM devices have been developed to provide twice the memory data bandwidth of SDR SDRAMs. The term DDR refers to the fact that the peak data rate is twice the rate at which commands can be clocked into the devices. DDR SDRAM devices typically allow commands to be entered on the positive edge of the system clock, and allow data transfers on both the rising and falling edges of the system clock to provide twice as much data as a SDR SDRAM device. DDR SDRAM devices typically employ a 2n-prefetch architecture, in which the internal data bus is twice the width of the external data bus. With this architecture, each read access cycle internal to the device provides two external data words, and each write access cycle internal to the device writes two combined external data words into the device.

In a purely synchronous system, output data (and capture of the output data by a memory controller) would be referenced to a common free-running system clock. In such a system, the maximum data rate would be reached when the sum of the output access time and the flight time approaches the bit time. Although the data rates could be increased by generating delayed clocks for early data launch and/or late data capture, these data rates would still be limited because these techniques do not account for the fact that the data valid window (i.e., the "data eye") moves relative to any fixed clock signal due to changes in temperature, voltage or loading. To allow for even higher data rates, data strobe signals were added to DDR SDRAM devices. The data strobe signals are non-free-running signals driven by the device driving the data (i.e., the DDR SDRAM devices for READs, and the memory controller for WRITEs). For READs, the data strobe signal is effectively an additional output having a predetermined pattern. For WRITEs, the data strobe signal is used by the SDRAM device as a clock in order to capture the corresponding input data.

Figure 1:
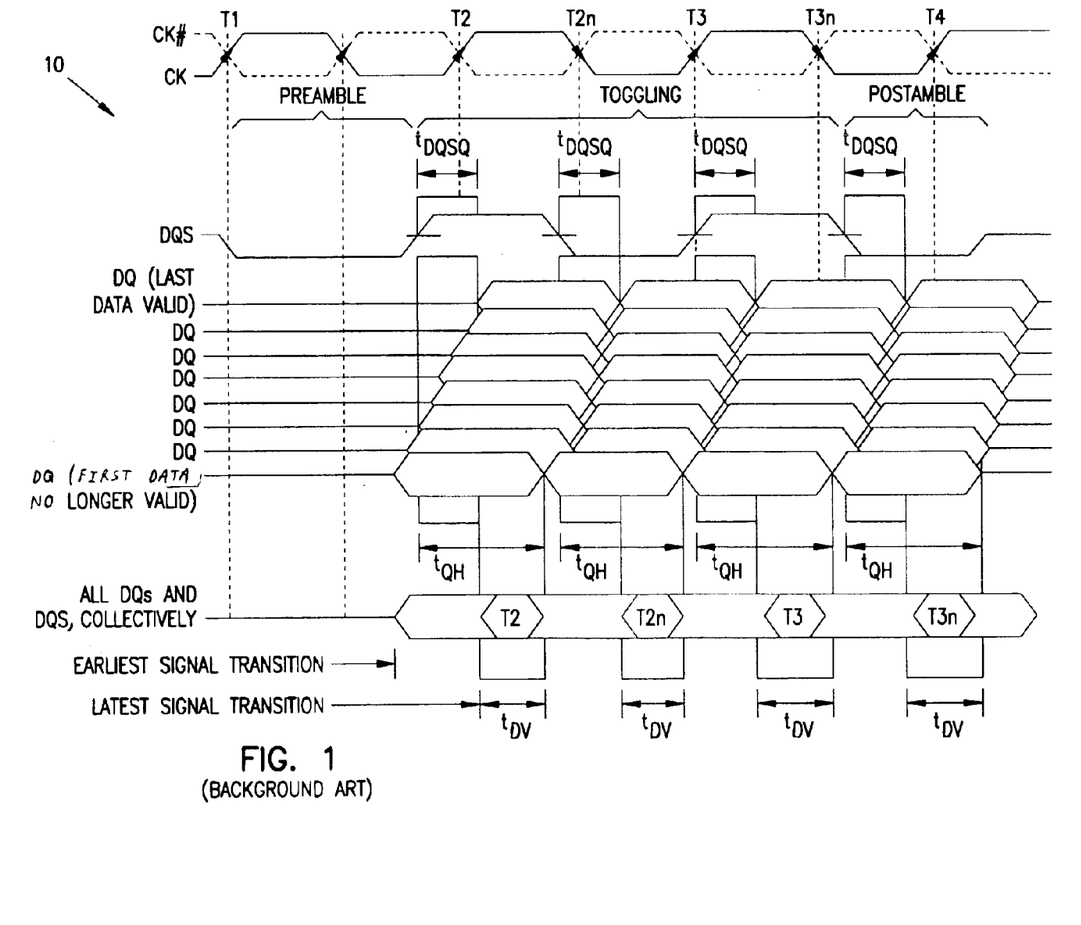
FIG. 1 is a data output timing diagram for an existing double data rate (DDR) synchronous dynamic random access memory (SDRAM) integrated circuit device.

Referring to FIG. 1, a data output timing diagram 10 for an existing DDR SDRAM device illustrates the relationship between the bidirectional data strobe signal and the data input/output signals for an exemplary READ operation (e.g., a four-word burst). In this example, the DDR SDRAM is assumed to be a 64 Mb×8 DDR SDRAM device available from Micron Technology, Inc. The CK and CK# signals represent differential system clock inputs, the DQS signal represents the data strobe signal, and the DQ signals represent the data input/output signals forming the device data bus. The DQS signal includes preamble, toggling, and postamble portions. The preamble portion provides a timing window for the receiving device to enable its data capture circuitry with a known/valid level present on the DQS signal. After the preamble portion, the DQS signal toggles in the toggling portion at the same frequency as the CK signal for the duration of the four-word data burst. Each high transition and each low transition of the DQS signal is associated with one data word, provided by the DQ signals driven by the DDR SDRAM device. In the postamble portion, the DQS signal goes low to indicate the end of the data burst to the receiving device. Thus, as shown, the data words are transmitted at twice the frequency of the system clock CK.

As illustrated in FIG. 1, the DQS signal is nominally edge-aligned with all of the DQ signals such that all of these output signals will transition at the output pins of the DDR SDRAM device at nominally the same time. The memory controller will then internally delay the DQS signal to the center of the received data eye upon capturing the data. The edge-alignment of the DQS and the DQ signals occurs because these output signals are all clocked out of the DDR SDRAM device by the same internal clock signal. Ideally, the DQS and DQ signals would all be perfectly aligned. However, as also shown in FIG. 1, the transitions of the DQS and DQ signals include a spread or distribution in time, which is due to both static effects (e.g., internal routing mismatch) and dynamic effects (e.g., data pattern and simultaneously switching outputs (SSO)). Even if critical signals are properly laid out on the die (e.g., using matching trace lengths), inherent differences in the package leadfingers' parasitics will contribute to this spread between the DQS and DQ signals, which is referred to as "output skew". The output skew is specified by a parameter known as $t_{DQSQ}$, which is the pin-to-pin skew measured at the DQS and DQ outputs of the device (i.e., the time between the transition of the DQS signal and the last DQ data valid). This skew (or $|t_{DQSQ}|$) region is a region of uncertainty since at least one of the output signals is not valid. It is noted that the DQS signal may transition first, last, or somewhere in the middle of the DQ transition window. Maximum $t_{DQSQ}$ is currently specified as 500 psec.

The data word being read will be valid once the latest DQ signal in the group has transitioned, and will remain valid until the earliest DQ signal transitions as part of the next data word, or upon completion of the burst. The duration of this data valid window is specified by the $t_{DV}$ parameter, as shown in FIG. 1. The time between the transition of the DQS signal to the first DQ signal going non-valid is referred to as $t_{QH}$ (also shown). As is suggested by FIG. 1, output skew $t_{DQSQ}$ has an adverse impact on data valid window $t_{DV}$. In particular, a relatively long output skew region will cause the data valid window to be relatively short. Since the memory controller can only capture data during the data valid window $t_{DV}$, the output skew $t_{DQSQ}$ will also adversely impact the data capture operation.

Thus, although the addition of data strobe signals allowed for increased data rates, the operating speeds of existing DDR SDRAM devices are still limited by the output skew specified by the $t_{DQSQ}$ parameter. In particular, the output skew limits the operating speed (e.g., access and cycle times) of DDR SDRAM devices. Therefore, it would be desirable to provide a method and apparatus for reducing skew across the output data bus of a DDR SDRAM device, thereby enlarging the data eye for data capture by the memory controller. It would also be desirable to provide a method and an apparatus for reducing skew across multiple output signals in other memory device types, and other integrated circuit devices.

SUMMARY OF THE INVENTION

According to one aspect of the invention, a synchronous integrated circuit device having an output bus for outputting a plurality of output signals includes a clock input buffer, a delay line coupled to the clock input buffer, and an output circuit coupled to the delay line. The clock input buffer receives a system clock signal and generates a buffered clock signal. The delay line receives the buffered clock signal and generates a delayed clock signal. The output circuit includes a plurality of output signal paths for outputting the plurality of output signals synchronously with the system clock signal by using the delayed clock signal. At least one of the output signal paths includes a delay circuit and an output buffer coupled to the delay circuit. Each delay circuit provides a programmable delay to the delayed clock signal to generate a unique delayed clock signal which is used for clocking an output signal into the respective output buffer.

According to another aspect of the invention, a method of outputting output signals on an output bus of a synchronous integrated circuit device with decreased output skew includes receiving a system clock signal, delaying the system clock signal to generate a delayed clock signal, and applying the delayed clock signal to a plurality of output signal paths. In each of the output signal paths, the method includes using the delayed clock signal to output the output signals synchronously with the system clock signal. In at least one of the output signal paths, the method further includes providing a programmable delay to the delayed clock signal to generate a unique delayed clock signal used for clocking an output signal out from the respective output signal path.

Other aspects of the present invention will be apparent upon reading the following detailed description of the invention and viewing the drawings that form a part thereof.

DETAILED DESCRIPTION

In the following detailed description, reference is made to the accompanying drawings, which form a part hereof, and in which is shown by way of illustration specific embodiments in which the present invention may be practiced. These embodiments are described in sufficient detail to enable those skilled in the art to practice the present invention, and it is to be understood that the embodiments may be combined, or that other embodiments may be utilized and that structural, logical and electrical changes may be made without departing from the spirit and the scope of the present invention. The following detailed description is, therefore, not to be taken in a limiting sense, and the scope of the present invention is defined by the appended claims and their equivalents.

Figure 2:
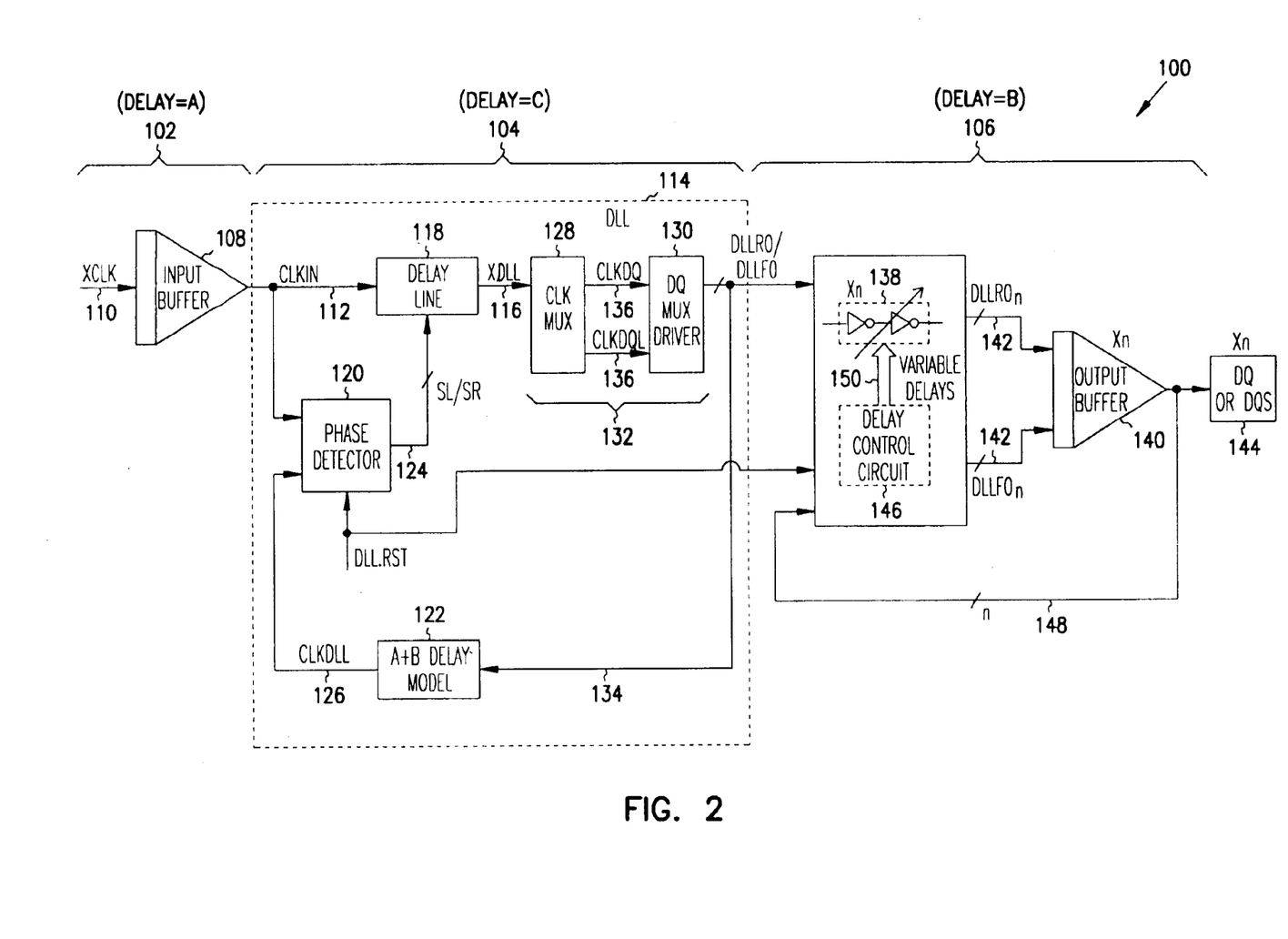
FIG. 2 is a circuit block diagram of a DDR SDRAM device having decreased output skew in accordance with one embodiment of the present invention.

Referring to FIG. 2, an exemplary synchronous integrated circuit device 100 in accordance with one embodiment of the present invention comprises a clock input circuit 102, a clock delay circuit 104, and an output circuit 106. In this example, device 100 comprises a double data rate (DDR) synchronous dynamic random access memory (SDRAM) device having improved output skew in comparison with previous DDR SDRAM devices. This DDR SDRAM device may be similar to one of the DDR SDRAM devices available from Micron Technology, Inc., except for the features described herein. For example, the DDR SDRAM device may be similar to an MT46V8M8, 64 Mb, ×8 DDR SDRAM device available from Micron Technology, Inc., except for the features described herein. This DDR SDRAM device is configured as a 2 M×8×4 banks DDR SDRAM. Additional background information for the MT46V8M8 DDR SDRAM device is provided by its data sheet, entitled "Double Data Rate (DDR) SDRAM, 64 Mb: ×4, ×8, ×16 DDR SDRAM", Micron Technology, Inc., 2000, and from the article entitled "DDR SDRAM Functionality and Controller Read Data Capture", Micron DesignLine, Vol. 8, Issue 3, 3Q99. Both of these documents are incorporated herein by reference in their entirety.

In other embodiments, the apparatus and methods for improving output skew that are disclosed herein may be used in other types of DDR SDRAM devices having other configurations. Alternatively, the disclosed apparatus and methods may be used in other synchronous memory devices, or other synchronous integrated circuit devices, for use in improving output skew for a plurality of output signals which are output on an output bus. The apparatus and methods are described herein in reference to a particular DDR SDRAM device for convenience only, and the invention should not be limited to such a device.

In one embodiment, clock input circuit 102 includes a clock input buffer 108. Clock input buffer 108 has an input node for receiving an external or system clock signal (XCLK) 110, and an output node for generating an internal or buffered clock signal (CLKIN) 112. Clock input buffer 108 provides an inherent delay having a value of A. The detailed implementation of clock input buffer 108 will depend on the particular application.

In one embodiment, clock delay circuit 104 includes a delay locked loop (DLL) 114 coupled between clock input buffer 108 and output circuit 106. DLL 114 is configured to receive buffered clock signal (CLKIN) 112 from clock input buffer 108, and to generate a delayed clock signal (XDLL) 116. In the embodiment of FIG. 2, DLL 114 includes a delay line 118, a phase detector 120, and an A+B delay model 122. Delay line 118 has an input node for receiving buffered clock signal (CLKIN) 112, and an output node for generating delayed clock signal (XDLL) 116. Delay line 118 is configured to delay buffered clock signal (CLKIN) 112 by an adjustable amount under the control of a DLL control signal 124 to generate delayed clock signal (XDLL) 116. Phase detector 120 has a first input node for receiving buffered clock signal (CLKIN) 112, a second input node for receiving an internal DLL clock signal (CLKDLL) 126, and an output node for generating DLL control signal 124. Phase detector 120 is configured to detect the phase difference between buffered clock signal (CLKIN) 112 and internal DLL clock signal (CLKDLL) 126, and to generate DLL control signal 124 based upon the phase difference. DLL control signal 124 is then applied to delay line 118 to control the amount of delay. Delay model 122 has an input node coupled (indirectly) to delayed clock signal (XDLL) 116, and an output node coupled to the CLKDLL input node of phase detector 120. Delay model 122 models the sum of the delays of input circuit 102 (i.e., A) and output circuit 106 (i.e., B).

Clock delay circuit 104 is thus configured to provide a delay, having a value of C, which is substantially equal to the period of system clock signal (XCLK) 110 less the sum of the delays of input circuit 102 and output circuit 106. In other words, clock delay circuit 104 provides a delay having a value of $C=t_{XCLK}-(A+B)$. By providing delay C, clock delay circuit 104 will cause output signal transitions to appear at the outputs of device 100 in nominal alignment with the XCLK transitions at the input of device 100. For example, if $t_{XCLK}$=7.5 nsec (i.e., an XCLK frequency of 133 MHz), A=1.5 nsec and B=3.5 nsec, then C=7.5 nsec−(1.5+3.5 nsec)=2.5 nsec. By providing such a delay, clock delay circuit 104 will cause the output signals of device 100 to transition one (1) clock cycle (i.e., 7.5 nsec) after a transition of XCLK, such that the output signals will be aligned with the next transition of XCLK. While delays A and B will vary with voltage and temperature, DLL 114 will vary the value of the delay provided by clock delay circuit 104 (i.e., delay C) in order to keep the output signals synchronous with system clock signal (XCLK) 110.

In one embodiment, delayed clock signal (XDLL) 116 would be coupled directly to the input node of A+B delay model 122, and the delay provided by delay line 118 would be equal to the delay provided by DLL 114. In another embodiment, as shown in FIG. 2, DLL 114 also includes a clock multiplexer 128 and a DQ multiplexer driver 130, which are collectively referred to herein as a clock driver circuit 132. Clock driver circuit 132 has an input node coupled to delay line 118, and a pair of output nodes 134 coupled to output circuit 106 and to A+B delay model 122. Clock driver circuit 132 is configured to receive delayed clock signal (XDLL) 116, to multiplex XDLL 116 into differential delayed clock signals (CLKDQ, CLKDQL) 136, and to drive the differential delayed clock signals to generate a rising-edge delayed clock signal (DLLR0) and a falling-edge delayed clock signal (DLLF0) on output nodes 134. Clock driver circuit 132 can thus be used to meet fanout requirements for connecting the DLLR0/DLLF0 signals to output circuit 106. The total amount of delay provided by clock delay circuit 104 in this embodiment (i.e., C) is the delay provided by delay line 118 plus the inherent delay of clock driver circuit 132.

The generation of both rising-edge and falling-edge delayed clock signals (DLLR0 and DLLF0) may be advantageous for a DDR SDRAM device, where data is clocked into and out of the device on both the rising and falling edges of the system clock signal 110. In particular, these DLLR0/DLLF0 signals can advantageously be used to output first and second data words synchronously with rising and falling edges of system clock signal 110.

In other embodiments, clock delay circuit 104 includes different types of delay locked loops. For example, circuit 104 may comprise a digital DLL, an analog DLL, a continually locked loop, a periodically calibrated delay line, etc. Further, clock delay circuit 104 may or may not include a clock driver circuit, and may or may not generate both rising-edge and falling-edge delayed clock signals, depending on the particular application.

Output circuit 106 has one or more input nodes coupled to clock delay circuit 104 for receiving one or more delayed clock signals. The received delayed clock signal(s) may include delayed clock signal (XDLL) 116, or both rising-edge and falling-edge delayed clock signals (DLLR0/DLLF0) 134. For simplicity, the remainder of this description assumes that output circuit 106 receives the DLLR0/DLLF0 signals, as shown in FIG. 2. As described further below, output circuit 106 includes a plurality (i.e., n) of output signal paths configured to output the plurality of output signals synchronously with system clock signal (XCLK) 110 by using delayed clock signals DLLR0/DLLF0. In the case of device 100 being a DDR SDRAM device, the n output signal paths include one output signal path for outputting a bidirectional data strobe signal DQS, and (n-1) output signal paths for outputting (n-1) data input/output signals DQs, in response to a read command. For a ×8 DDR SDRAM, n would equal nine (9), and the nine output data paths would include one output signal path for the DQS signal, and eight output data paths for the eight DQ signals.

In one embodiment, each of the n output signal paths of output circuit 106 includes a variable or programmable delay circuit 138 and an output buffer 140. Each delay circuit 138 has two input nodes for receiving rising-edge and falling-edge delayed clock signals (DLLR0/DLLF0) 134, and has two output nodes for generating unique rising-edge and falling-edge delayed clock signals (DLLR0n and DLLF0n) 142. Each delay circuit 138 is configured to provide a programmable delay to delayed clock signals (DLLR0/DLLF0) 134 to generate unique delayed clock signals (DLLR0n/DLLF0n) 142 for the nth output signal path. In this embodiment, the amount of delay provided by each of the delay circuits 138 is independent of the amount of delay provided by any of the other delay circuits 138. Each of the unique delayed clock signals (DLLR0n/DLLF0n) 142 is applied to the output buffer 140 of that particular output signal path, and is used to clock an output signal (i.e., one of the DQ signals or the DQS signal) into the respective output buffer. Each output buffer 140 then provides the output signal to an output pad 144, which is typically connected to a pin (i.e., one of the DQ pins or the DQS pin) on the integrated circuit package for device 100.

The delays provided by delay circuits 138 are programmed to decrease output skew across the n output signals. Note that, if all of the delay circuits 138 (i.e., the delay circuits for all of the n output signal paths) were programmed to the same delay value, then the transitions of the DQ and DQS output signals could still include a relatively large spread in time due to factors such as internal routing mismatch, data pattern and simultaneously switching outputs, and inherent differences in the package lead-fingers' parasitics. By independently programming each delay circuit 138, however, the factors contributing to output skew can be compensated for, and the output skew of device 100 can be reduced.

In one embodiment, output circuit 106 also includes delay control logic 146 for dynamically programming delay circuits 138 during operation of device 100. Delay control logic 146 is in a feedback path from the DQ and DQS output signals to delay circuits 138. Delay control logic 146 has input nodes to receive the n output signals 148 from output buffers 140 (or from other nodes within the output signal paths, such as output pads 144), and has output nodes for generating delay control signals 150 for delay circuits 138. Delay control logic 146 is configured to determine output skew between the DQ and DQS signals, and to generate delay control signals 150 so as to reduce, minimize or eliminate the skew between the DQ and DQS output signals 148 (or the DQ and DQS signals at pads 144).

In one embodiment, delay control circuit 146 is configured to determine the slowest (i.e., worst case) DQ or DQS output signal. The delay circuit 138 corresponding to this slowest output signal is set to a zero or minimal delay value. Then, delay control circuit 146 detects the output skew between each of the other DQ or DQS signals and the slowest output signal, and individually programs the delay circuit 138 corresponding to this other DQ or DQS signal based upon the output skew detected for that DQ or DQS signal. For example, if delay control circuit 146 determines that the DQ3 signal is the slowest output signal, and that the output skew between the DQ5 and the DQ3 signals is 100 psec (i.e., DQ5 is 100 psec ahead of DQ3), then delay control circuit 146 generates the delay control signal 150 for the delay circuit 138 for the DQ5 signal so as to cause a delay of about 100 psec. This 100 psec delay of the DQ5 signal will cause the DQ3 and DQ5 signals to become aligned. Delay control signals 150 are similarly generated for all of the other DQ and DQS output signals. Thus, by independently controlling the DLLR0n/DLLF0n signals 142, the output skew across all of the DQ and DQS output signals can be decreased, thereby enlarging the data eye for data capture by the memory controller. The decreased output skew also allows for increased operating speed (e.g., faster access and cycle times) for integrated circuit device 100.

In another embodiment, delay control circuit 146 defines a reference output signal path, such as that for the DQS output signal (although any of the output signal paths may be defined as the reference path). The delay circuit 138 for this reference output signal path is set to a midpoint delay value. The midpoint delay value may be set in the middle of the delay values that the delay circuit 138 is capable of providing (i.e., the 50% delay value), or may be set at some other point between the minimum and maximum delay values (e.g., a 25% or 75% delay). Then, delay control circuit 146 detects the output skew between each of the non-reference DQ or DQS signals and the reference output signal, and individually programs the delay circuit 138 for this non-reference DQ or DQS signal based upon the output skew detected for that DQ or DQS signal. The delay circuit 138 for any non-reference DQ or DQS signal slower than the reference signal is set to a delay value less than the midpoint delay (i.e., to speed up that non-reference signal), and the delay circuit 138 for any non-reference DQ or DQS signal faster than the reference signal is set to a delay value more than the midpoint delay (i.e., to slow down that non-reference signal). If, for example, delay control circuit 146 defines the DQS signal as the reference, and determines that the DQ3 signal is 100 psec slower than the DQS signal, the delay circuit 138 for the DQ3 signal is set to a delay value 100 psec less than the midpoint delay. If, on the other hand, delay control circuit 146 finds that the DQ3 signal is 50 psec faster than the DQS signal, then the delay circuit 138 for the DQ3 signal is set to a value 50 psec more than the midpoint delay. In either case, the DQ3 signal will become aligned with the DQS signal. Delay control signals 150 are similarly generated for all of the other non-reference output signals. Thus, any DQ or DQS signal can be sped up or slowed down to match any other DQ or DQS signal. Therefore, by independently controlling the DLLR0n/DLLF0n signals, the output skew across all of the DQ and DQS output signals can be decreased.

It should be understood that the embodiments of delay control circuit 146 described herein are exemplary, and that other embodiments of delay control circuit 146 may be used.

In order for delay control circuit 146 to detect output skew across the DQ and DQS output signals, the DQ and DQS signals should be simultaneously transitioning (e.g., both transitioning high, or both transitioning low). While the DQS signal of DDR SDRAM devices is defined so as to toggle during its toggling portion at the same frequency as the system clock signal for the duration of a read data burst, the DQ signals may or may not toggle, depending upon the particular data values that are being read. If, for example, the DQn signal were to remain at a logic 0 throughout a read data burst, or were to remain at a logic 1 throughout the read data burst, then delay control circuit 146 would be unable to compare transitions of the DQS signal to transitions of the DQn signal, and would therefore be unable to detect the output skew between the DQn and DQS signals. In this case, delay control circuit 146 would be unable to program delay circuits 138 during this data burst.

In one embodiment, device 100 uses an initialization mode of operation to insure that delay control circuit 146 has an opportunity to dynamically program delay circuits 138. As indicated by manufacturer data sheets, some DDR SDRAM devices include an initialization mode during which the DQ and DQS output signals are not valid, and should be ignored. For example, with the MT46V8M8 DDR SDRAM device, users are required to wait for at least 200 system clock cycles after issuing a reset command (i.e., a DLL_RST command) before issuing another command to the device. During this 200 clock cycle initialization period, this embodiment of device 100 is configured to toggle the DQ and DQS signals. Although these signals should be ignored by users, output logic 106 samples the output skew during this period, and dynamically generates delay control signals 150 to properly program delay circuits 138 to minimize output skew. The programmed delay circuits 138 can then be used to minimize output skew of the DQ and DQS signals after the initialization period ends. The programming of delay circuits 138 may be maintained until a subsequent re-initialization of the DDR SDRAM device, or until another point in time when delay control circuit 146 is able to determine the output skew for use as feedback.

In another embodiment, delay control circuit 146 performs dynamic sampling to determine output skew between DQ and DQS signals on any given simultaneous transitions of these signals. For example, delay control circuit 146 may determine output skew between any DQ signal and the DQS signal whenever that DQ signal and the DQS signal both have a rising edge, both have a falling edge, or both have either a rising edge or a falling edge. If, for example, delay control circuit 146 only determines output skew on simultaneous rising edges (or simultaneous falling edges), the same output skew could be used to program the delay circuit 138 for both the DLLR0n and DLLF0n signals. To insure that delay control circuit 146 has an opportunity to program delay circuits 138 in this embodiment, user software may be required to read appropriate data patterns from device 100 at appropriate times (e.g., periodically during operation). This embodiment may be combined with the previously-described embodiment, such that delay circuit programming will occur during initialization, and will then be periodically updated during operation.

Figure 3:
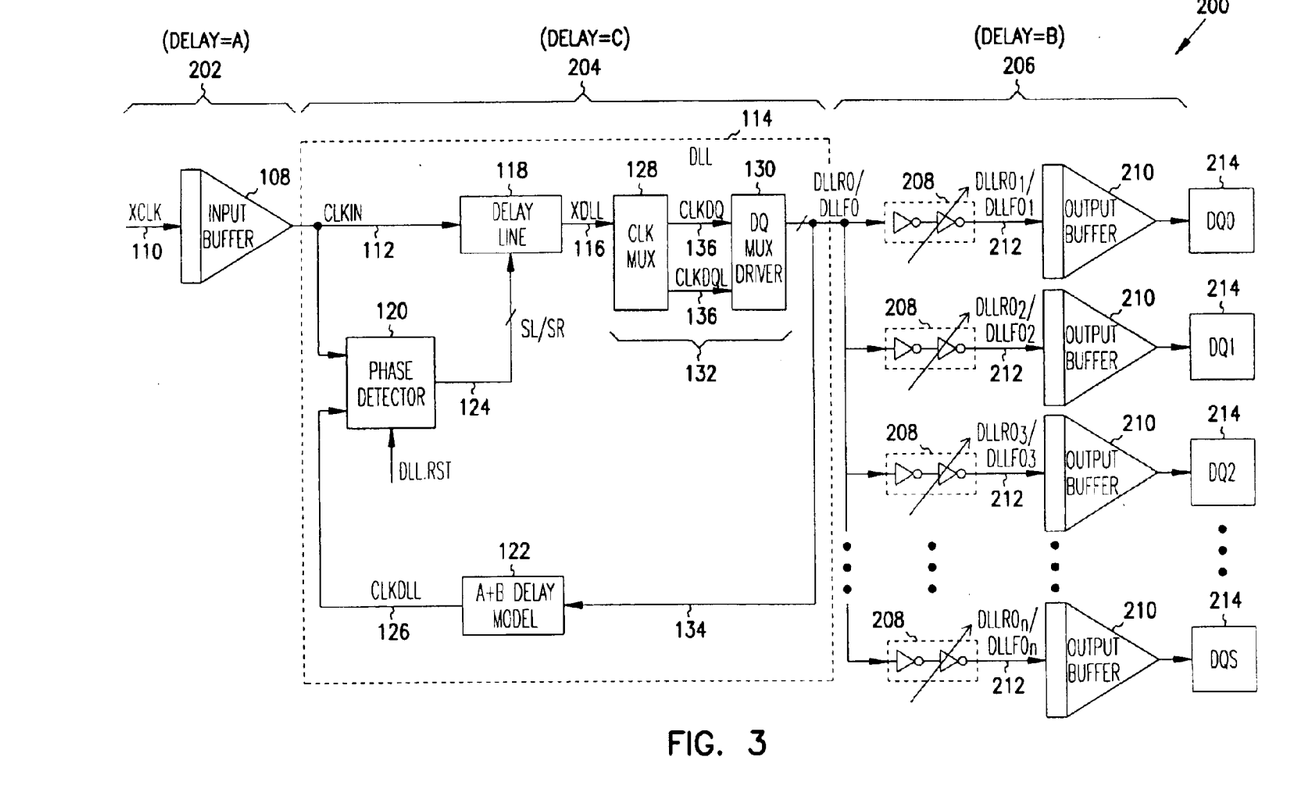
FIG. 3 is a circuit block diagram of a DDR SDRAM device having decreased output skew in accordance with another embodiment of the present invention.

Referring to FIG. 3, another exemplary synchronous integrated circuit device 200 in accordance with another embodiment of the present invention comprises a clock input circuit 202, a clock delay circuit 204, and an output circuit 206. While device 200 is again a DDR SDRAM device, the apparatus and methods for improving output skew in device 200 may be used in other types of memory devices, or integrated circuit devices. Clock input circuit 202 and clock delay circuit 204 have the same structure and operation as clock input circuit 102 and clock delay circuit 104, described above. However, while output circuit 106 of device 100 dynamically programs the delays provided by delay circuits 138 in the output signal paths during operation of device 100, output circuit 206 of device 200 is configured to set the amount of delay in each output signal path in a static fashion.

In one embodiment, output circuit 206 includes a plurality of output signal paths for outputting a plurality of output signals synchronously with system clock signal (XCLK) 110 by using delayed clock signal (XDLL) 116 or, as shown in FIG. 3, by using rising-edge and falling-edge delayed clock signals (DLLR0/DLLF0) 134. Again, for convenience, it is assumed output circuit 206 uses the DLLR0/DLLF0 signals, as shown. In the case of a DDR SDRAM, output circuit 206 includes n output signal paths, with the DQS signal being output by one output signal path and (n-1) DQ signals output on (n-1) output signal paths.

Each output signal path includes a variable delay circuit 208 and an output buffer 210. Each delay circuit 208 is coupled to clock delay circuit 204 to receive delayed clock signals (DLLR0/DLLF0) 134 therefrom. Each delay circuit 208 provides a variable delay to delayed clock signals DLLR0/DLLF0 to generate unique delayed clock signals (DLLR0n/DLLF0n) 212, for use in clocking output signals into nth output buffer 210. For example, in a ×8 DDR SDRAM device, there are nine (9) output signal paths, with eight (8) used to output the eight (8) DQ signals and one used to output the DQS signal. The signals output by output buffers 210 are then applied to a respective output pad 214.

The programming of variable delay circuits 208 is performed statically such that, once the programming has been performed, delay circuits 208 provide static delays. In one embodiment, the programming of delay circuits 208 takes place during the manufacturing process, during which output skew of device 200 is measured, and used to permanently configure delay circuits 208 to add or subtract delay so as to decrease output skew across the output signals. To reduce or eliminate output skew, delay circuits 208 may be configured to slow down each output signal path to match the speed of the slowest (i.e., worst case) output signal path, or to slow down or speed up each output signal path to match the speed of a reference output signal path (e.g., the DQS output signal path), in a manner similar to that described above for the operation of delay control circuit 146. In another embodiment, the intrinsic delay of each output signal path is estimated, modeled or measured during the design process for the integrated circuit device, and delay circuits 208 are each designed to provide an appropriate amount of delay to reduce or eliminate output skew. For example, once the signal routing paths on device 200 have been designed and are known, the intrinsic delay provided by each signal routing path can be determined, and then used to configure delay circuits 208 to provide appropriate amounts of delay. Note that, while static programming of delay circuits 208 can be employed to effectively reduce or eliminate output skew due to static factors, such as internal routing mismatch, such programming is less likely to be effective to reduce or eliminate output skew due to dynamic factors, such as skew due to data patterns and simultaneously switching outputs.

Note that, once the DQ and DQS signals have been de-skewed, the trimmable option fuses that are present in some current DDR SDRAM devices can be configured (e.g., blown) to shift the data window to optimize the access time (i.e., $t_{AC}$) of the DDR SDRAM device. The access time ($t_{AC}$) of DDR SDRAM devices is defined as the access window of the DQS from the clock signal (i.e., the difference in time between a clock edge and the related signal transition that access farthest away from that clock edge in time). By de-skewing the DQ and DQS signals of device 100, and by trimming device 100, the access time of device 100 can be lowered below the access times of the current devices.

In the embodiments of FIGS. 2 and 3, the output signal paths for all of the DQ and DQS signals include a programmable delay circuit. Alternatively, in other embodiments, fewer than all of the output signal paths include such a programmable delay circuit. For example, in one embodiment, a first output signal path (e.g., for the DQS signal) provides a non-programmable amount of delay, and the other output signal paths (e.g., for the DQ signals) include programmable delay circuits which are programmed to reduce output skew with respect to the first path. The non-programmable amount of delay of the first path may be an intrinsic delay due only to internal routing of that first path, or may be due to both internal routing of that first path and a fixed delay circuit coupled within that first path.

Figure 4:
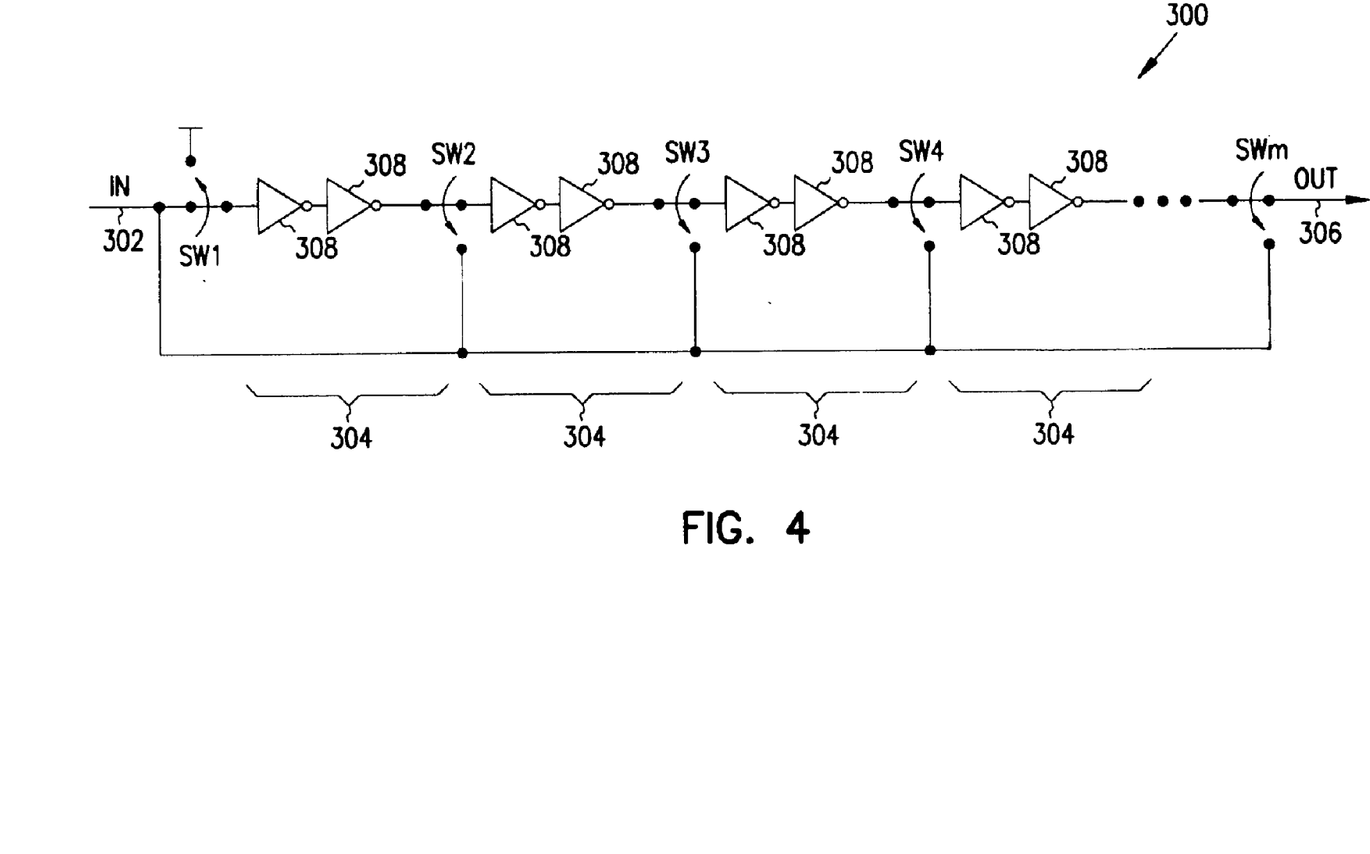
FIG. 4 is a block diagram showing one embodiment of a variable delay circuit for use in each of the output paths of the DDR SDRAM device shown in FIG. 2 or FIG. 3.

Referring to FIG. 4, a simplified block diagram shows one embodiment of a variable delay circuit 300 for use in the output signal paths of device 100 or device 200. Delay circuit 300 may be used to provide a unique delay to delayed clock signal (XDLL) 116, or to rising-edge and falling-edge delayed clock signals (DLLR0/DLLF0) 134, depending upon the particular application. Delay circuit 300 includes an input node 302, a plurality of delay stages 304 arranged in serial, and an output node 306. Each delay stage 304 includes a delay element, such as a pair of inverters 308, and a switching arrangement to selectively switch the delay element into and out of the operative circuit. If, for example, each of switches SW1, SW2, SW3, SW4, . . . , and SWm is in a first position as shown in FIG. 4, delay circuit 300 will provide a maximum amount of delay equal to the sum of the delays provided by each delay element. If, on the other hand, the SWm switch is then moved into its second position, then input node 302 will be connected directly to output node 306, and delay circuit 300 will provide a minimum amount of delay. By selectively controlling switches SW1 through SWm to switch different delay stages 304 in and out, delay circuit 300 can provide different amounts of delay under the control of the switches.

In the dynamic programming embodiment of device 100, delay control signals 150 provided by delay control circuit 146 are used to control the states of switches SW1 through SWm. In the static programming embodiment of device 200, the states of these switches may be permanently set using metal, fuses, antifuses, or other circuit elements. Note that the number of delay stages 304 in delay circuit 300, and the amount of delay provided by each delay stage, will depend upon the particular application. Generally, by increasing the number of delay stages, and decreasing the delay associated with each delay stage, finer resolution can be achieved and the amount of output skew can be decreased. Also note that each delay stage can be configured to provide a different amount of delay.

It should be understood that variable delay circuit 300 shown in FIG. 4 is merely illustrative of the many types of variable delay circuits that are known in the art, and many other types of variable delay circuits could also be used with the present invention.

Figure 5:
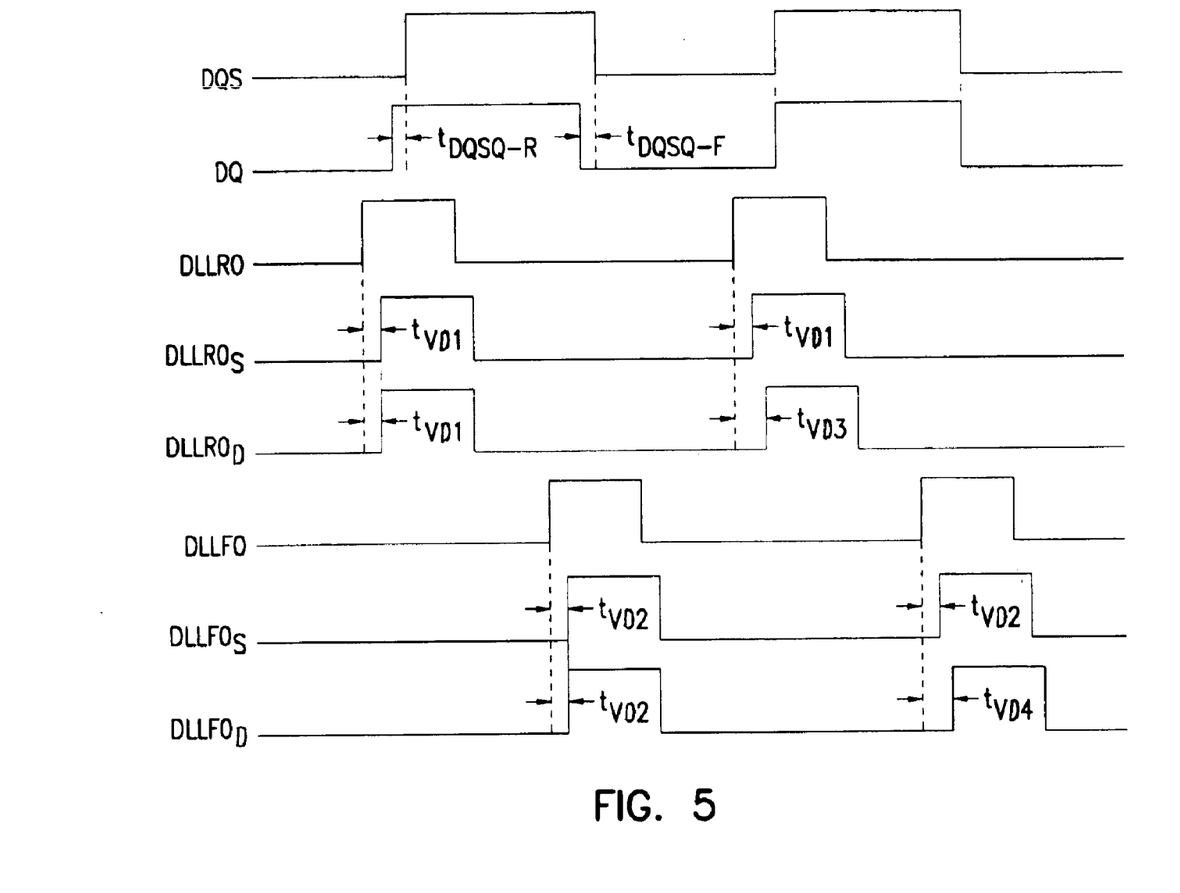
FIG. 5 is an exemplary data output timing diagram for the DDR SDRAM device of FIG. 2, wherein the variable delay element for one DQ signal is dynamically modified in order to decrease the output skew between that DQ signal and the DQS signal.

Referring to FIG. 5, an exemplary output data timing diagram for device 100 illustrates the dynamic modification of the variable delay circuit 138 for one of the DQ signals in order to decrease the output skew between that DQ signal and the DQS signal. In this example, it is assumed that the DQS signal has been selected as a reference signal having a midpoint delay, and that the timing of the DQ signal will be modified based upon output skew between the DQ signal and DQS signal in order to decrease the output skew.

In response to the first rising edge of the DLLR0 signal, the delay circuits 138 for both the DQ and DQS signals are assumed to provide a variable delay of $t_{VD1}$, thereby simultaneously generating the unique DLLR0n signals for the DQ and DQS signals (i.e., DLLR0$_D$ and DLLR0$_S$, respectively). While the DLLR0$_D$ and DLLR0$_S$ signals occur simultaneously, output skew introduced in the output signal paths for these two signals causes the rising edge of the DQ signal to lead the rising edge of the DQS signal by an amount $t_{DQSQ-R}$, which is the output skew between these signals. Similarly, in response to the first rising edge of the DLLF0 signal, the delay circuits 138 for both the DQ and DQS signals are assumed to provide a variable delay of $t_{VD2}$, thereby simultaneously generating the unique DLLF0n signals for the DQ and DQS signals (i.e., DLLF0$_D$ and DLLF0$_S$, respectively). While the DLLF0$_D$ and DLLF0$_S$ signals occur simultaneously, output skew introduced in the output signal paths for these two signals causes the falling edge of the DQ signal to lead the falling edge of the DQS signal by an amount $t_{DQSQ-F}$ (i.e., output skew).

The output skew between the DQ and DQS signals on both the rising and falling edges is detected by delay control circuit 146, which then adjusts the variable delay provided by the delay circuit 138 of the DQ signal to slow down that DQ signal by an appropriate amount to reduce the output skew relative to the reference DQS signal. As shown in FIG. 5, in response to the second rising edge of the DLLR0 signal, the delay circuit 138 for the DQS signal still provides the delay $t_{VD1}$ (which was not adjusted since the DQS signal is acting as a reference), but the delay circuit 138 for the DQ signal now provides a delay of $t_{VD3}$, thereby generating the unique DLLR0n signal for the DQ signal (i.e., DLLR0$_D$) only after the unique DLLR0n signal for the DQS signal (DLLR0$_S$). The additional delay provided by the delay circuit 138 for the DQ signal now compensates for the timing difference in the output signal paths for these two signals, and causes the rising edge of the DQ signal to be aligned with the rising edge of the DQS signal, thereby reducing or eliminating the output skew between these signals. Similarly, in response to the second rising edge of the DLLF0 signal, the delay circuit 138 for the DQS signal still provides the delay $t_{VD2}$, but the delay circuit 138 for the DQ signal now provides a delay of $t_{VD4}$, thereby generating the unique DLLF0n signal for the DQ signal (i.e., DLLF0$_D$) only after the unique DLLF0n signal for the DQS signal (DLLF0$_S$). The additional delay provided by the delay circuit 138 for the DQ signal now compensates for the timing difference in the output signal paths for these two signals, and causes the falling edge of the DQ signal to be aligned with the falling edge of the DQS signal, thereby reducing or eliminating the output skew between these signals. Thus, the DQ and DQS signals have now been aligned, and the output skew between these signals has been reduced or eliminated. Note that the timing diagram shown in FIG. 5 is merely illustrative, and the actual timing diagram would depend upon the particular implementation of the circuits.

Figure 6:
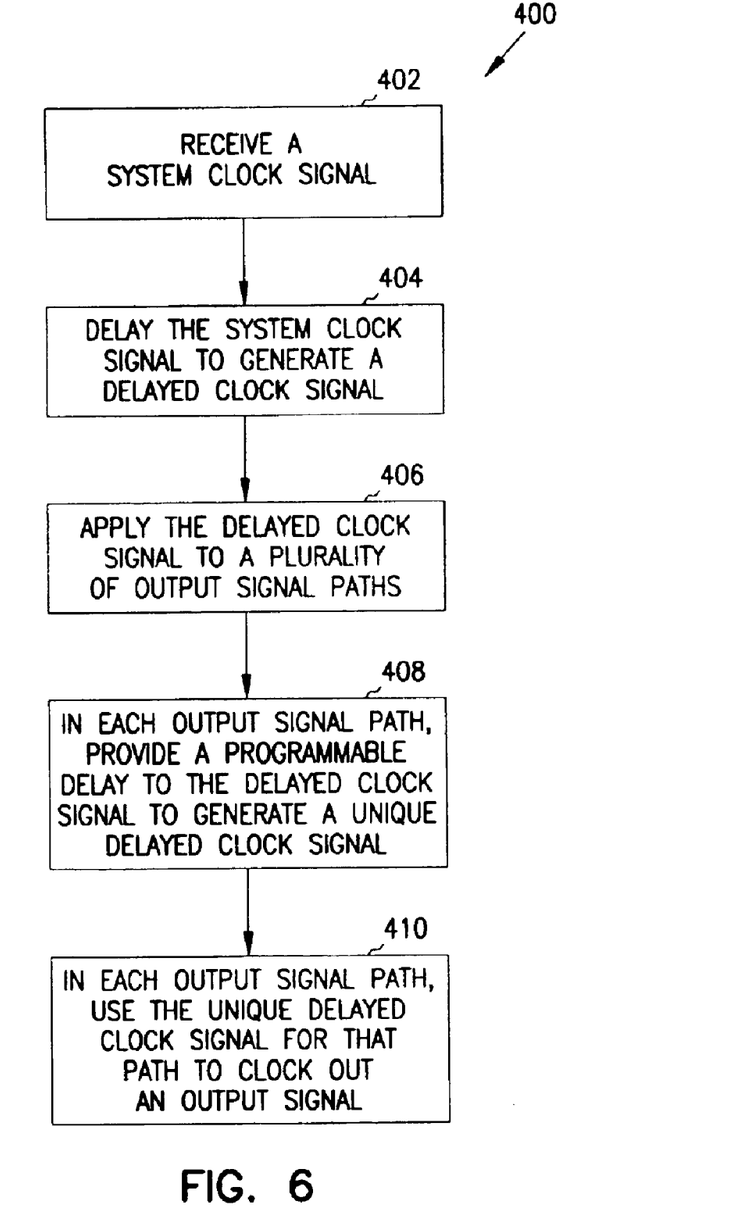
FIG. 6 is a flowchart showing a method of decreasing output skew in an integrated circuit device which generates multiple output signals (e.g., a DDR SDRAM device).

Referring to FIG. 6, a method 400 of decreasing output skew in a synchronous integrated circuit device such as device 100 in accordance with one embodiment of the present invention is shown. Method 400 includes receiving a system clock signal (at 402), delaying the system clock signal to generate a delayed clock signal (at 404), and applying the delayed clock signal to a plurality of output signal paths (at 406). In each of the output signal paths, method 400 also includes providing a programmable delay to the delayed clock signal to generate a unique delayed clock signal (at 408), and using the unique delayed clock signal for that output signal path to clock out an output signal (at 410). Each programmable delay is provided to decrease output skew across the output signals.

Conclusion

Thus, an apparatus and method for reducing skew across the output data bus of a DDR SDRAM device have been described herein. By reducing output skew, the data eye for the memory controller has been enlarged, and limits on operating speed of the device due to output skew can be reduced to allow for faster operation. An apparatus and method for reducing skew across multiple data output signals in other memory device types, and across multiple output signals in other integrated circuit devices, have also been described.

The above description is intended to be illustrative, and not restrictive. Many other embodiments will be apparent to those of ordinary skill in the art. For example, an apparatus or method in accordance with the present invention may be used in other types of memory devices, or other integrated circuit devices. Also, different types of input circuits, delay circuits, and output circuits may be used. Further, the apparatus and method of the present invention may be configured to sample output skew only on the rising edges of the output signals, or only on the falling edges, or on both the rising and falling edges. Also, the delays provided by the programmable delay circuits may be programmed statically and/or dynamically, and the programmable delay circuits may be provided in all or only a portion of the output signal paths. Different types of variable delay elements may be used, and may provide different lengths of delays and different resolutions of delay. The scope of the present invention should therefore be determined with reference to the appended claims, along with the full scope of equivalents to which such claims are entitled.

What is claimed is:

1. A synchronous integrated circuit device, comprising:
a clock input buffer configured to receive a system clock signal and to generate a buffered clock signal;

a delay line coupled to the clock input buffer, the delay line configured to receive the buffered clock signal and to generate a delayed clock signal; and an output circuit coupled to the delay line, the output circuit including a plurality of output signal paths configured to output the plurality of output signals synchronously with the system clock signal by using the delayed clock signal;

wherein at least one of the output signal paths includes a delay circuit and an output buffer coupled to the delay circuit, each delay circuit is connected to a delay control circuit which determines the amount of delay required for the at least one of the output signal paths based upon feedback from the plurality of output signal paths, and each delay circuit is configured to provide a programmable delay to the delayed clock signal to generate a unique delayed clock signal which is used for clocking an output signal into the respective output buffer.

2. The device of claim 1, wherein the programmable delay provided by each delay circuit is programmed to decrease output skew across the output signals.

3. The device of claim 1, wherein the clock input buffer provides a first delay, each output signal path provides a second delay, and the delay line provides a third delay based upon a delay model of the sum of the first delay and the second delay.

4. The device of claim 1, further comprising a phase detector to control the delay line based upon a phase difference between the buffered clock signal and a signal generated by applying a delay model to the delayed clock signal.

5. The device of claim 1, wherein the programmable delay provided by each delay circuit is programmed dynamically.

6. The device of claim 1, wherein the programmable delay provided by each delay circuit is programmed statically.

7. The device of claim 1, wherein the programmable delay provided by each delay circuit is programmed based upon output skew during operation of the device.

8. The device of claim 1, wherein the programmable delay provided by each delay circuit is programmed based upon an output skew between a first output signal that was output from the respective output signal path and a second output signal.

9. The device of claim 1, wherein the device has an initialization mode of operation wherein the output signals are toggled, and the programmable delay provided by each delay circuit is programmed during initialization operation.

10. A synchronous integrated circuit device, comprising:
a clock input buffer configured to receive a system clock signal and to generate a buffered clock signal;
a delay locked loop (DLL) coupled to the clock input buffer and configured to receive the buffered clock signal and to generate a delayed clock signal;
an output circuit coupled to the DLL, the output circuit including a plurality of output signal paths configured to output the plurality of output signals synchronously with the system clock signal by using the delayed clock signal;
wherein at least one of the output signal paths includes a delay circuit and an output buffer coupled to the delay circuit, each delay circuit configured to provide a programmable delay to the delayed clock signal to generate a unique delayed clock signal which is used for clocking an output signal into the respective output buffer; and
wherein the programmable delay is set based upon feedback from others of the output signal paths to synchronize the output signal with other output signals.

11. The device of claim 10, wherein the programmable delay provided by each delay circuit is programmed to decrease output skew across the output signals.

12. The device of claim 10, wherein the clock input buffer provides a first delay, each output signal path provides a second delay, and the DLL provides a third delay based upon a delay model of the sum of the first delay and the second delay.

13. The device of claim 10, wherein the DLL includes a delay line coupled between the clock input buffer and the output circuit, and a phase detector to control the delay line based upon a phase difference between the buffered clock signal and a DLL clock signal generated by applying a delay model to the delayed clock signal.

14. The device of claim 13, wherein the DLL also includes a clock driver circuit coupled between the delay line and output circuit, the clock driver circuit configured to drive the delayed clock signal to each of the plurality of output signal paths.

15. The device of claim 10, wherein the DLL comprises a digital DLL.

16. The device of claim 10, wherein the DLL comprises an analog DLL.

17. A synchronous integrated circuit device, comprising:
a clock input buffer configured to receive a system clock signal and to generate a buffered clock signal;
a delay line coupled to the clock input buffer, the delay line configured to receive the buffered clock signal and to generate a delayed clock signal;
an output circuit coupled to the delay line, the output circuit including a plurality of output signal paths configured to output the plurality of output signals synchronously with the system clock signal by using the delayed clock signal;
wherein the output signal paths each includes a variable delay circuit and an output buffer coupled to the delay circuit, each delay circuit configured to provide an independent variable delay to the delayed clock signal to generate a unique delayed clock signal for clocking an output signal into the respective output buffer; and
wherein each of the variable delay of each of the delay circuit is programmed based upon the delay of others of the plurality of output signals from other output buffers.

18. The device of claim 17, wherein the variable delay provided by each of the delay circuits is determined so as to decrease output skew across the output signals.

19. The device of claim 17, wherein the clock input buffer provides a first delay, the output signal paths provide a second delay, and the delay line provides a third delay based upon a delay model of the sum of the first delay and the second delay.

20. The device of claim 17, further comprising a clock driver circuit coupled between the delay line and the output circuit, the clock driver circuit configured to drive the delayed clock signal to each of the plurality of output signal paths.

21. The device of claim 17, wherein the independent variable delay provided by each variable delay circuit is dynamically determined.

22. The device of claim 17, wherein the independent variable delay provided by each variable delay circuit is statically determined.

23. The device of claim 17, wherein the independent variable delay provided by each variable delay circuit is based upon output skew measured during operation.

24. The device of claim 17, wherein the independent variable delay provided by each variable delay circuit is based upon output skew between a first output signal that is output from the respective output signal path and a second output signal.

25. The device of claim 17, wherein the device has an initialization mode of operation wherein the output signals are toggled, and the independent variable delay provided by each delay circuit is programmed during initialization operation.

26. The device of claim 17, wherein one of the output signal paths is the slowest output signal path, and the variable delay provided by each of the delay circuits is individually programmed based upon the slowest output signal path so as to align the plurality of output signals, thereby decreasing skew across the output signals.

27. The device of claim 17, wherein one of the output signal paths is defined as a reference output signal path, the delay circuit for the reference output signal path provides a midpoint delay, and the delay circuits for the remaining output signal paths provide less or more than the midpoint delay if the corresponding output signal path is slower or faster than the reference output signal path, respectively.

28. A method of outputting a plurality of output signals of a synchronous integrated circuit device with decreased output skew, comprising:
receiving a system clock signal;
delaying the system clock signal to generate a delayed clock signal;
applying the delayed clock signal to a plurality of output signal paths;
in each of the output signal paths, using the delayed clock signal to output the plurality of output signals synchronously with the system clock signal; and
in at least one of the output signal paths, providing a programmable delay to the delayed clock signal to generate a unique delayed clock signal which is used for clocking an output signal out from the respective output signal path by determining the programmable delay based upon delay of the plurality of output signals.

29. The method of claim 28, wherein each programmable delay is provided to decrease output skew across the output signals.

30. The method of claim 28, wherein receiving the system clock signal includes buffering the system clock signal.

31. The method of claim 28, wherein delaying the system clock signal includes detecting a phase difference between the system clock signal and a signal generated by applying a delay model to the delayed clock signal, and using the detected phase difference to control the amount of delay provided to the system clock signal.

32. The method of claim 28, wherein delaying the system clock signal includes applying the system clock signal as an input signal to a DLL.

33. The method of claim 28, wherein providing each programmable delay takes place dynamically.

34. The method of claim 28, wherein providing each programmable delay includes determining output skew during an initialization mode of device operation.

35. The method of claim 28, wherein applying the delayed clock signal to the plurality of output signal paths includes driving the delayed clock signal, thereby increasing fanout of the delayed clock signal.

36. A method of outputting a plurality of output signals on an output bus of a synchronous integrated circuit device with decreased output skew, comprising:
receiving a system clock signal;
delaying the system clock signal to generate a delayed clock signal;
applying the delayed clock signal to a plurality of output signal paths;
in each of the output signal paths, using the delayed clock signal to output the plurality of output signals synchronously with the system clock signal;
in each of the plurality of output signal paths, providing an independent variable delay to the delayed clock signal to generate a unique delayed clock signal for use in clocking an output signal out from the respective output signal path; and
determining the delay of each of the plurality of output signals to determine the independent variable delay for each of the plurality of output signal paths.

37. The method of claim 36, wherein each independent variable delay is provided to decrease output skew across the output signals.

38. The method of claim 36, further comprising determining the output signal path which is the slowest output signal path, wherein providing each variable delay is based upon the slowest output signal path so as to align the output signals.

39. The method of claim 36, further comprising defining one of the output signal paths as a reference output signal path, wherein providing the variable delay for the reference output signal path includes providing a midpoint delay, and providing the variable delay for the remaining output signal paths includes providing less or more than the midpoint delay if the corresponding output signal path is slower or faster than the reference output signal path, respectively.

40. An apparatus for outputting an output signal on an output bus of a synchronous integrated circuit device with decreased output skew, comprising:
an input circuit for receiving a system clock signal;
a delay line coupled to the input circuit for delaying the system clock signal;
an output circuit coupled to the delay line for outputting an output signal, the output circuit including a programmable delay circuit for providing a programmable delay to the delayed system clock signal for use in clocking out the output signal; and
wherein the programmable delay is determined from an amount of delay of the output signals based upon feedback from s plurality of output signals.

41. An apparatus for outputting a plurality of output signals of a synchronous integrated circuit device with decreased output skew, comprising:
an input circuit for receiving a system clock signal;
a delay line coupled to the input circuit for delaying the system clock signal;
an output circuit coupled to the delay line for outputting a plurality of data output signals,
the output circuit including at least one programmable delay circuit for providing a programmable delay to the delayed system clock signal for use in clocking out at least one of the data output signals with decreased skew across an output bus;
a feedback path is connected to the output circuit for receiving an amount of delay of the data output signals based; and
a delay control circuit connected to the feedback path and to the programmable delay circuit for determining the programmable delay based upon the delay of the data output signals.

* * * * *

UNITED STATES PATENT AND TRADEMARK OFFICE
CERTIFICATE OF CORRECTION

PATENT NO. : 6,889,336 B2
DATED : May 3, 2005
INVENTOR(S) : Schoenfeld et al.

It is certified that error appears in the above-identified patent and that said Letters Patent is hereby corrected as shown below:

Column 16,
Line 44, after "from" delete "s" and insert -- the --, therefor.

Signed and Sealed this

Sixteenth Day of August, 2005

JON W. DUDAS
*Director of the United States Patent and Trademark Office*